No. 762,990. PATENTED JUNE 21, 1904.
C. L. DUNNING.
APPARATUS FOR TEACHING MUSIC.
APPLICATION FILED NOV. 9, 1903.
NO MODEL.
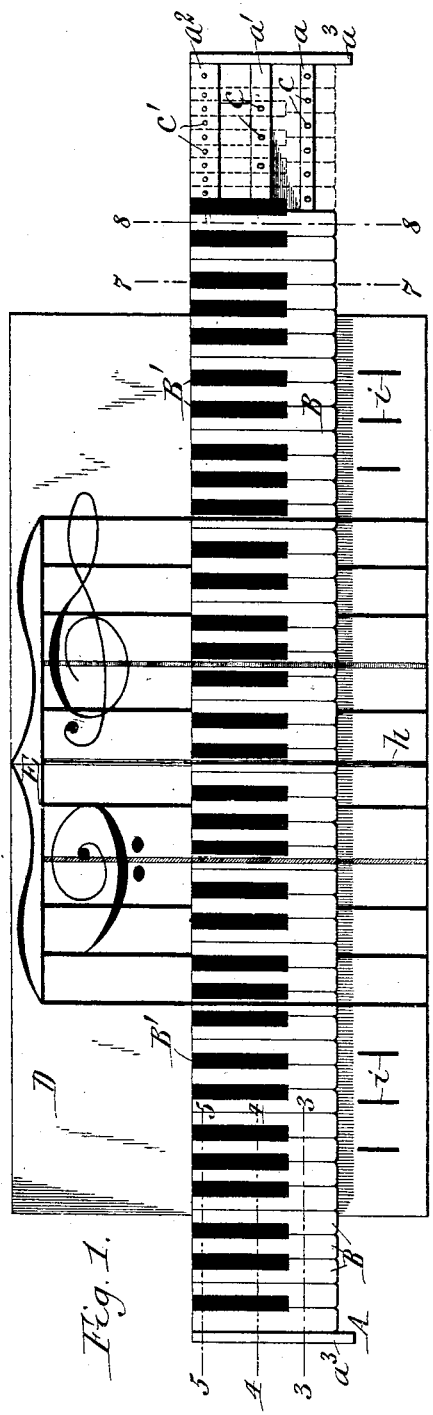
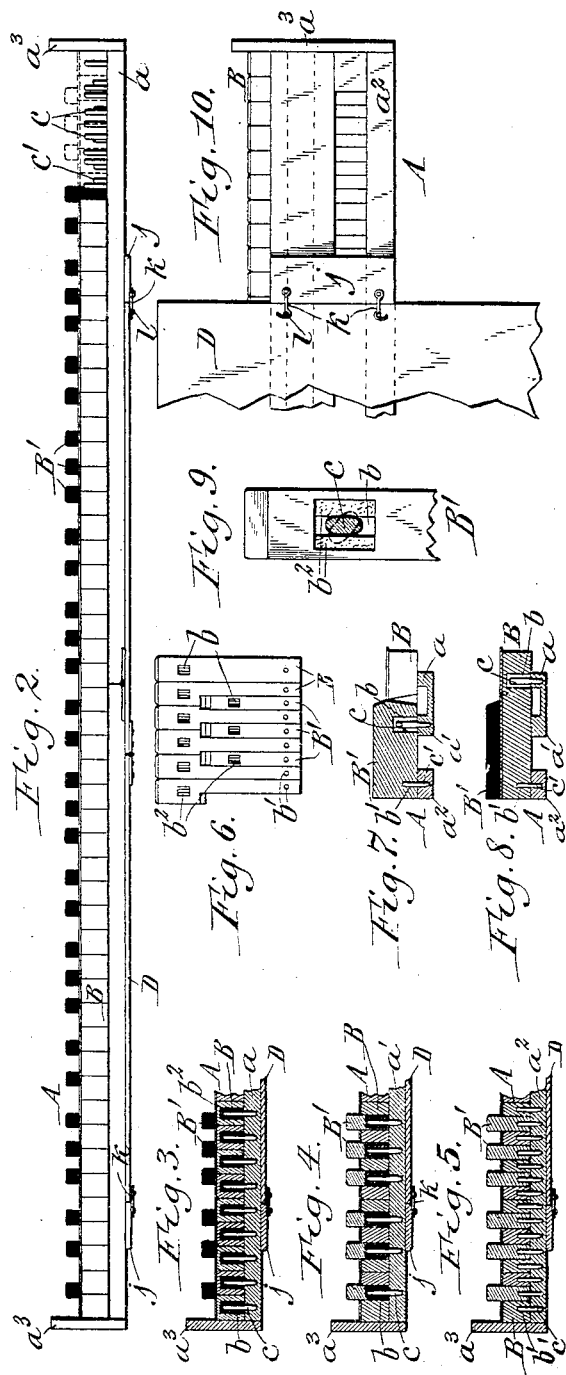
Witnesses:
Robert Weitknecht
Louis W. Gratz
Carrie L. Dunning, Inventor
By Geyer & Popp
Attorneys No. 762,990.

Patented June 21, 1904.

UNITED STATES PATENT OFFICE.

CARRIE L. DUNNING, OF BUFFALO, NEW YORK.

APPARATUS FOR TEACHING MUSIC.

SPECIFICATION forming part of Letters Patent No. 762,990, dated June 21, 1904.

Application filed November 9, 1903. Serial No. 180,282. (No model.)

*To all whom it may concern:*

Be it known that I, CARRIE L. DUNNING, a citizen of the United States, residing at Buffalo, in the county of Erie and State of New York, have invented new and useful Improvements in Apparatus for Teaching Music, of which the following is a specification.

This invention relates to an apparatus designed generally for teaching music, but more particularly for teaching notation, intervals, scales, &c., in connection with the keys of a piano or similar instrument.

The object of my invention is to provide an apparatus of this character which associates the lines of the single and the double or grand staff with the piano-keys in such a manner that the relation of the notes on the staff to the names of the piano-keys can be readily comprehended, especially by children.

The invention has the further object to improve the construction of the dumb or object-lesson keyboards employed in teaching apparatus of this kind.

In the accompanying drawings, Figure 1 is a top plan view of my improved apparatus, a number of the keys being omitted at the right-hand end of the board. Fig. 2 is a front view of the apparatus. Figs. 3, 4, and 5 are fragmentary longitudinal sections on the correspondingly-numbered lines in Fig. 1. Fig. 6 is a bottom plan view of a number of the keys. Figs. 7 and 8 are transverse sections in lines 7 7 and 8 8, Fig. 1. Fig. 9 is an enlarged bottom plan view of one of the keys, showing its retaining-pin in horizontal section. Fig. 10 is a fragmentary bottom plan view of the keyboard and the base-board, showing the means for fastening the same together.

Similar letters of reference indicate corresponding parts throughout the several views.

A indicates a dumb keyboard forming part of my improved apparatus. The frame of this board may be of any suitable construction, but preferably consists of longitudinal strips $a\ a'\ a^2$, connected by transverse pieces $a^3$.

B indicates the white keys of the keyboard, which rest upon the three strips $a\ a'\ a^2$, and B' the black keys, which rest upon the rear and intermediate strips $a'\ a^2$. These keys are preferably detachable, so that they may be removed and replaced by pupils for impressing upon their minds the relative locations of the keys. In the construction shown in the drawings the keys are provided in their under sides, near the opposite ends, with sockets or openings $b\ b'$, which receive upright pins $c\ c'$ driven into the strips $a\ a'\ a^2$. One opening of each key, preferably the front opening, is rectangular in form and lined with felt or similar yielding material, as shown at $b^2$, to increase the friction between the pin and the walls of the opening and more securely hold the key in place. The upper portions of the front pins, which fit into these lined openings, are oblong and normally arranged lengthwise of the keys, as shown by full lines in Fig. 9. By this construction when the keys become loose by wear of their felt-lined openings they may be tightened by turning the pins at a greater or less angle to the keys, as shown by dotted lines in Fig. 9. This turning of the oblong pins, which may done with a suitable wrench, has the same effect as if the pins were widened, thus causing them to fit snugly in the key-openings.

D is a base or board arranged underneath the greater portion of the keyboard A and having painted or otherwise represented thereon a musical staff E, the lines of which run at right angles to the keyboard, or, in other words, parallel with the keys. A grand or double staff is shown in the drawings; but the invention is equally applicable to a single staff. The lines of this staff are uniformly spaced in the usual manner and are arranged to coincide, respectively, with the corresponding white keys B—that is, the first or "G" line of the lower staff registers with the white piano-key which represents the note "G," the second line registers with the key which represents the note "B," the third line with the piano-key which represents the note "D," and so on throughout the remaining lines of the staff. By this arrangement the names of the lines and the notes placed thereon are directly associated with the piano-keys denoting the same notes, and the youthful mind can thereby readily grasp the relation between corresponding staff-lines and piano-keys.

The extreme upper and lower lines of the staff are preferably continued upon the upper faces of the corresponding piano-keys representing "G" in the bass clef and "F" natural in the treble clef, as shown in Fig. 1, in order to clearly indicate to pupils the section of the keyboard included within the boundaries of the grand staff exclusive of the added or leger lines. For this purpose each of the piano-keys just mentioned is provided with a longitudinal line registering with the corresponding staff-line on the base-board D and represented by the same color as said line.

In order to distinguish the clef-lines "F" and "G" from the other lines, these lines are of different colors—for example, the bass-clef line may be green, the treble-clef line blue, and the remaining lines of the staff black. These clef-lines are also preferably continued upon the corresponding piano-keys, as shown in Fig. 1.

To indicate to the pupil the line of division between the piano-keys belonging to the treble and bass clefs, respectively, I place an additional line $h$ midway between the upper and lower staves, which line coincides with the piano-key denoting middle "C." This division-line is red or of some other color which distinguishes it from the staff-lines and is preferably continued upon said middle "C" key, as shown.

In addition to the staff-lines the base-board D may bear a number of added or leger lines $i$, spaced to register with the corresponding white piano-keys, as seen in Fig. 1.

For the purpose of retaining the dumb keyboard in the proper position relatively to the grand staff the frame of the keyboard is provided on its under side with stops or cleats $j$, which bear against the lateral edges of the base-board D, as shown in Figs. 2 and 10. The keyboard may be removably secured to the base-board by hooks $k$, attached to the under sides of the cleats $j$ and engaging with pins $l$ on the adjacent portion of the base-board, or by any other suitable means.

The keyboard A and the base-board D are preferably composed of hinged sections, as shown, so that they can be folded into a small compass and conveniently carried and transported.

In teaching musical notation and the relation of the piano-keys to the lines of the staff with this apparatus it is advantageous to employ disks of different colors bearing letters corresponding to the names of the staff lines and spaces, the pupils being required to place the disks on the corresponding lines and spaces.

I claim as my invention—

1. An apparatus of the character described, consisting of a keyboard, and a board arranged adjacent thereto and bearing a musical staff, the lines of said staff being arranged in alinement with the corresponding keys of the keyboard and some of said keys bearing lines which form continuations of the corresponding staff-lines, substantially as set forth.

2. An apparatus of the character described, consisting of a keyboard, and a base-board arranged underneath the same and bearing a musical staff, the lines of said staff being arranged to coincide with the corresponding keys of the keyboard and said keys being provided with lines forming continuations of the corresponding staff-lines, substantially as set forth.

3. An apparatus of the character described, consisting of a keyboard and a base-board arranged underneath the same and bearing a musical staff the lines of which coincide with the corresponding keys of said keyboard, the clef-line of the staff being suitably distinguished from the other lines thereof and said keys being provided with lines forming continuations of the corresponding staff-lines and having the same distinguishing characteristics as said lines, substantially as set forth.

4. An apparatus of the character described, consisting of a keyboard and a base-board arranged underneath the same and bearing a musical grand staff, the lines of which coincide with the corresponding keys of the keyboard, the clef-lines being distinguished by color from each other and from the remaining lines of the staff and the keys corresponding to said clef-lines being provided with lines forming continuations of said clef-lines and represented by the same colors as said lines, substantially as set forth.

5. An apparatus of the character described, consisting of a keyboard, and a board arranged adjacent thereto and bearing a musical grand staff and a division-line placed between the upper and lower staffs and arranged to coincide with the piano-key denoting middle "C," said key being provided with a line which forms a continuation of said division-line, substantially as set forth.

6. An apparatus of the character described, comprising a keyboard, and a base-board bearing a musical staff the lines of which extend crosswise of the keyboard and are arranged to register with the corresponding piano-keys, said keyboard being provided with stops for retaining the keyboard in proper relation to the staff on said base-board, substantially as set forth.

7. An apparatus of the character described, comprising a keyboard, a base-board arranged underneath the same and bearing a musical staff the lines of which register with the corresponding piano-keys, and means for removably securing said keyboard to the base-board, substantially as set forth.

Witness my hand this 6th day of November, 1903.

CARRIE L. DUNNING.

Witnesses:
THEO. L. POPP,
EMMA M. GRAHAM.